(12) United States Patent
Payne et al.

(10) Patent No.: US 10,171,693 B2
(45) Date of Patent: Jan. 1, 2019

(54) BEZEL WITH BARS FOR PROTECTING A CALIBRATION LABEL

(71) Applicant: HEWLETT-PACKARD DEVELOPMENT COMPANY, L.P., Houston, TX (US)

(72) Inventors: David M. Payne, Star, ID (US); Edward A. Hill, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 15/113,551

(22) PCT Filed: Jan. 30, 2014

(86) PCT No.: PCT/US2014/013767
§ 371 (c)(1),
(2) Date: Jul. 22, 2016

(87) PCT Pub. No.: WO2015/116085
PCT Pub. Date: Aug. 6, 2015

(65) Prior Publication Data
US 2017/0034375 A1    Feb. 2, 2017

(51) Int. Cl.
*H04N 1/00*    (2006.01)
*H04N 1/12*    (2006.01)

(52) U.S. Cl.
CPC ..... *H04N 1/00551* (2013.01); *H04N 1/00015* (2013.01); *H04N 1/00023* (2013.01);
(Continued)

(58) Field of Classification Search
CPC ........... H04N 1/00551; H04N 1/00034; H04N 1/00045; H04N 1/00063; H04N 1/00087; H04N 1/00557; H04N 1/00562
(Continued)

(56) References Cited

U.S. PATENT DOCUMENTS 7,209,618 B2   4/2007  Boyd
8,559,065 B2   10/2013 Deamer
(Continued)

FOREIGN PATENT DOCUMENTS

JP       2001113863      4/2001
KR    10-2005-0109438    11/2005
WO     WO-2013043163     3/2013

OTHER PUBLICATIONS

Xerox Service Manual, (Research Paper), Mar. 2005, 432 Pages.

*Primary Examiner* — Jamares Q Washington
(74) *Attorney, Agent, or Firm* — HP Inc. Patent Department

(57) ABSTRACT

An apparatus can include a frame having a first side and a second side spaced apart from and substantially parallel to the first side by a third side that interconnects and extends longitudinally between the first side and the second side. The third side can define a portion of a media path. A surface of the third side includes a calibration area in the media path, the calibration area extending from an input edge to an exit edge in a media path direction that is substantially transverse to the longitudinal dimension of the third side. A plurality of bars can protrude outwardly from the surface of the third side in the calibration area. Each of the bars extends in the media path direction and has a leading edge and a trailing edge, the leading edge.

16 Claims, 5 Drawing Sheets

(52) U.S. Cl.
CPC ..... *H04N 1/00034* (2013.01); *H04N 1/00045* (2013.01); *H04N 1/0062* (2013.01); *H04N 1/00063* (2013.01); *H04N 1/00087* (2013.01); *H04N 1/00557* (2013.01); *H04N 1/121* (2013.01); *H04N 2201/0422* (2013.01)

(58) Field of Classification Search
USPC .................................................. 358/504, 518
See application file for complete search history.

(56) References Cited

U.S. PATENT DOCUMENTS

| | | | |
|---|---|---|---|
| 8,786,914 B1 * | 7/2014 | Mui | H04N 1/00039 358/461 |
| 2003/0072039 A1 | 4/2003 | Liu et al. | |
| 2006/0132606 A1 | 6/2006 | Lan | |
| 2012/0033268 A1 | 2/2012 | Huang | |
| 2012/0105920 A1 | 5/2012 | Murray | |

* cited by examiner

BEZEL WITH BARS FOR PROTECTING A CALIBRATION LABEL

BACKGROUND

Image capture products, such as scanners, copiers, photocopiers, and the like, are widely used. These products allow for the quick capture of an original image from a medium, and the subsequent reproduction of the original image on another medium. It is extremely important that the reproduction image accurately reflects the original image. One aspect of accurate image reproduction involves the occasional calibration of the image capture product. It is known to utilize a calibration label that is provided in the image capture product for use during calibration.

DETAILED DESCRIPTION

This disclosure is directed to an apparatus that can be implemented to protect a calibration zone for an image capture device (e.g., scanners, photocopiers, multi-function devices and the like). The apparatus can be implemented as part of a bezel of an automatic document feeder of the image capture device. For example, a portion of a frame in a media path can include an arrangement of wear bars that protrude outwardly from a substantially planar calibration region. The wear bars can be configured to facilitate travel of media (e.g., paper or other printable media) across and through the calibration region but mitigate contact between the media and a calibration label that is also disposed in the calibration region. The calibration label includes an optical surface that is used for calibrating an image sensor of the image capture device.

As an example, the wear bars can extend longitudinally in a media path direction across at least a portion of the calibration region. Since the wear bars extend beyond the calibration label in the calibration region, media traveling through the calibration region can engage the wear bars instead of the calibration label. As a result, the optical surface of the calibration label can be substantially protected.

Figure 1:
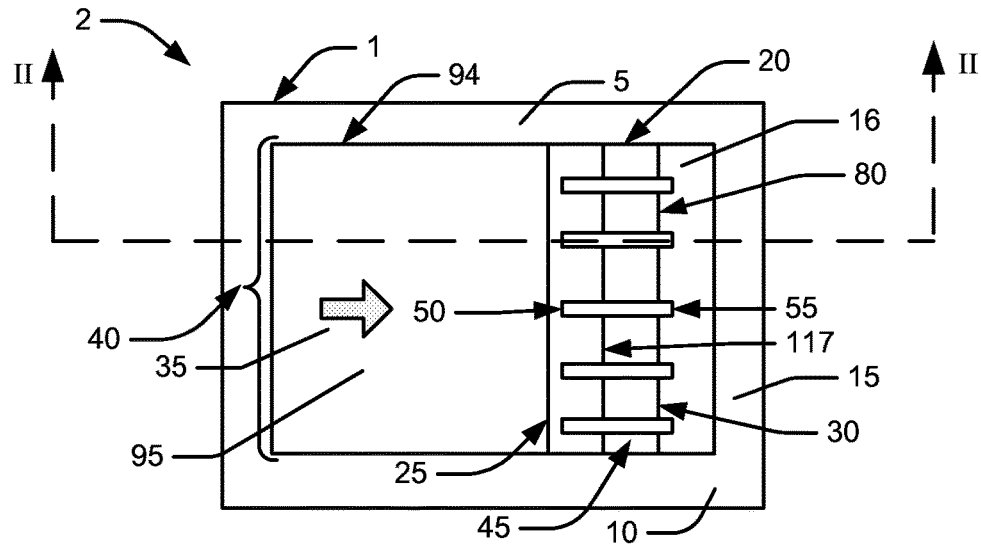
FIG. 1 illustrates a plan view of an example of a bezel with bars for protecting a calibration label.

FIGS. 1-4 illustrate an example of a bezel 2 that includes bars 45 configured to protect a calibration label. In the example of FIG. 1, the bezel 2 has a generally rectangular frame 1. As an example, the frame 1 may be made out of a thermoplastic material such as acrylonitrile-butadiene-styrene, nylon, polycarbonate, polypropylene, or polystyrene. However, the frame 1 can be made out of any other suitable material that promotes inexpensive and rapid manufacture. The frame 1 has a first side 5 and a second side 10. The first and second sides 5 and 10 extend substantially parallel to one another. A zone between the first and second sides 5 and 10 defines a media path 40 through which one or more sheets of media can travel. The media path 40 can be configured to guide media in a media path direction, demonstrated by arrow 35. The media path 40 thus extends substantially parallel to a longitudinal direction of the first and second sides 5 and 10. As an example, the media path 40 can be implemented as a media path residing in an automatic document feeder of an image capture device.

The frame 1 also includes a third side 15 that extends between and interconnects the first and second sides 5 and 10. A surface of the third side 15 includes a calibration area 20. The calibration area 20 is located in the media path 40 and extends in the media path direction 35 from an input edge 25 to an exit edge 30 thereof. In the example of FIG. 1, the calibration area 20 is substantially rectangular between the first and second sides 5 and 10 and the input and exit edges 25 and 30 of the calibration area 20. In other examples, the calibration area 20 can have a different shape. The calibration area 20 is positioned in the media path to be in the field of view of an image sensor. As an example, the image sensor can be a contact image sensor that includes a linear array of detectors, a focusing lens and one or more sources of illumination (e.g., light emitting diodes). For instance, the contact image sensor can be in near direct contact with the object that is to be scanned, which can include media that travels through the media path 40 and/or a predetermined pattern on an optical surface of a calibration label disposed in the calibration area 20. Other image sensors (e.g., charge coupled devices) could also be used.

The third side 15 can also include includes a media return area 16. The media return area 16 extends between the first and second sides 5 and 10 of the frame 1. The media return area 16 has a ramp 17 that is positioned downstream of the calibration area 20 in the media path 40. The ramp 17 may have a generally arcuate surface that extends smoothly from the exit edge 30 of the calibration area 20 (see, e.g., FIGS. 2, 4 and 6). In other examples, the ramp 17 may have any other shape that is conducive to smoothly transitioning media from the calibration area 20 as it travels along the media path 40 through the bezel 2. For example, the ramp 17 may also be planar.

The calibration area 20 also includes a plurality of bars 45. The bars 45 can extend outwardly from the surface of the third side 15 in the calibration area 20 a distance sufficient to mitigate contact between media traveling through the media path 40 and the surface in the calibration area 20. The bars 45 can extend substantially parallel to the media path direction 35. Additionally, the bars 45 can be evenly distributed across the calibration area 20 between the sides 5 and 10.

The plurality of bars 45 may be monolithically formed with the calibration area 20 and the frame 1, as to provide a monolithic structure. In some examples, the entire bezel 2 can be formed as a monolithic structure, including the bars 45, such as by an injection molding or other manufacturing process. However, in other examples, the bars 45 may also be formed separately from the frame 1 and subsequently attached to the calibration area 20. For example, the bars 45 may be attached by way of adhesive, ultrasound welding, threaded fasteners, snap fitting, or any other appropriate attachment technique. As disclosed herein, one or more calibration labels can be disposed on a base surface 21 in the calibration area 20 and the bars 45 thus can help protect an optical surface of the calibration label. For example, the calibration label can extend between the first and second sides 5 and 10 and from an input edge to an exit edge of the calibration area.

By way of example, the spacing between the bars 45 across the calibration area 20 can be set according to performance characteristics and depend on a length of the calibration area between sides 5 and 10. As one example, the spacing between the bars 45 may range from about 50 mm to about 70 mm. As a further example, each of the bars 45 may have a width ranging from about 1 mm to about 2 mm. However, the dimensions of each bar 45 may be altered to achieve different performance characteristics and vary depending on the size of the image capture device in which the bezel 2 is implemented.

Each of the bars 45 extends in the media path direction from a leading edge 50 to a trailing edge 55 thereof. The leading edge 50 can be adjacent to the input edge 25 of the calibration area 20, and the trailing edge 55 can be adjacent to the exit edge 30 of the calibration area 20. As used herein, the term "adjacent" refers to a relative proximity for the position of the leading edge 50 and/or trailing edge 55 with respect to the sides of the calibration area 20. In some examples, "adjacent" can mean that the leading edge 50 directly abuts against the input edge 25 of the calibration area 20. In other examples, the term "adjacent" can mean that the leading edge 50 is spaced apart from the input edge 25 of the calibration area 20 along the media path direction 35 by a predetermined distance.

Figure 2:
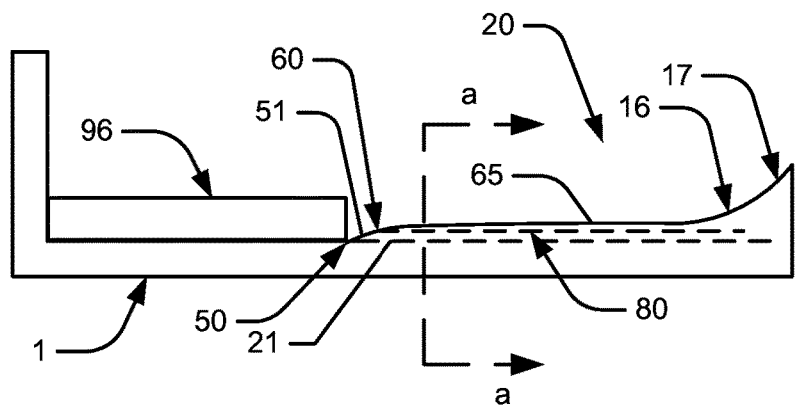
FIG. 2 illustrates a sectional view along "II-II" of FIG. 1.
Figure 2A:
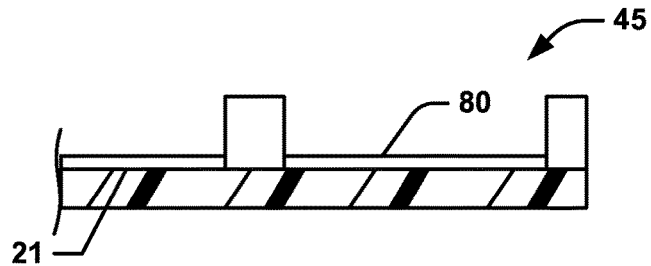
FIG. 2a illustrates a sectional view along "a-a" of FIG. 2.
Figure 3:
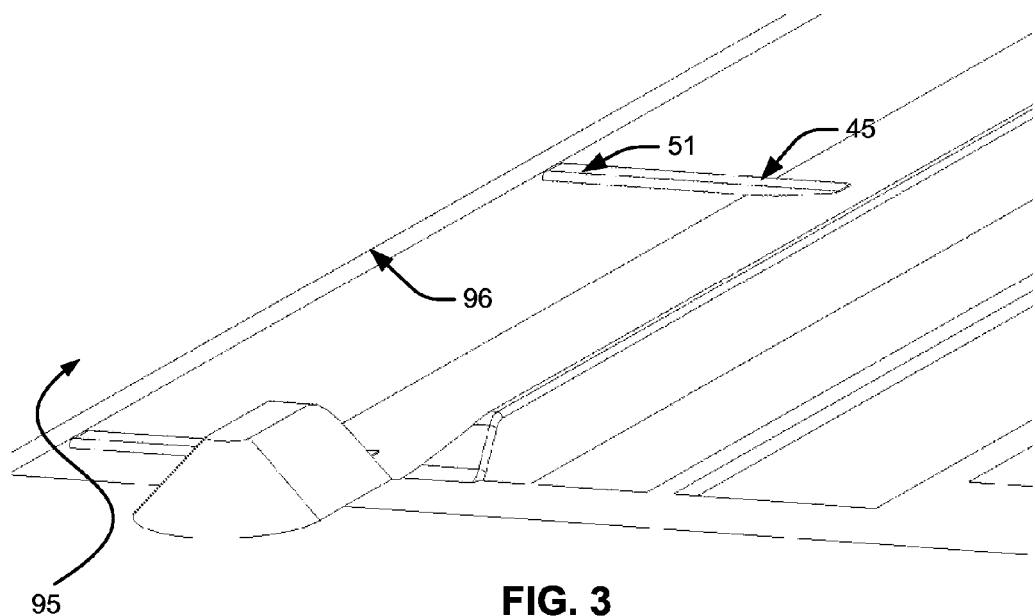
FIG. 3 illustrates a perspective view of the bezel with bars for protecting a calibration label shown in FIG. 1.
Figure 4:
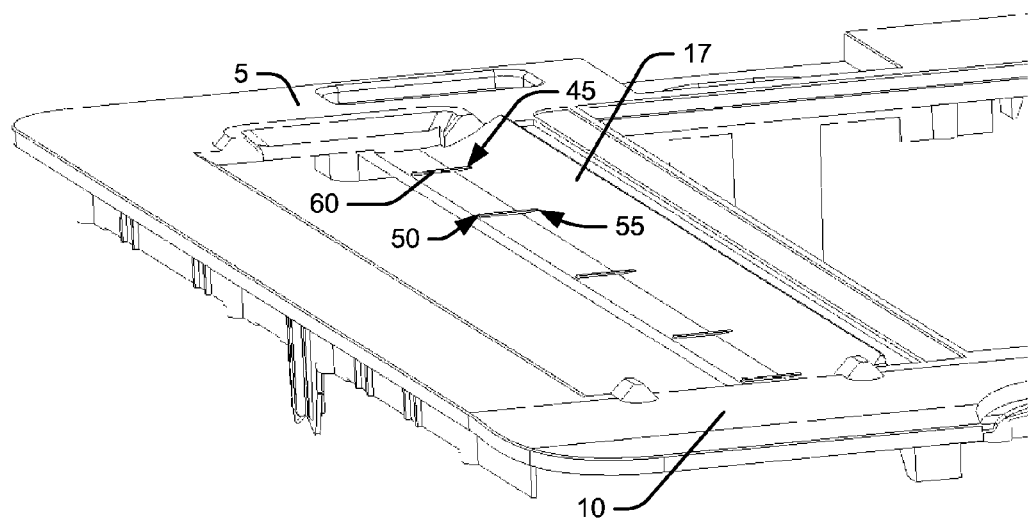
FIG. 4 illustrates an enlarged perspective view of a portion of the bezel showing bars for protecting a calibration label shown in FIG. 1.

As demonstrated in FIG. 2, the leading edge 50 can include a ramp 60 that extends from a base surface 21 of the calibration area 20 into an intermediate region 65 of the bar 45. The ramp 60 may have a generally arcuate surface. However, the ramp 60 may have any other shape that is conducive to smoothly transitioning media along the media path 40 through the bezel 2 into the calibration area 20. For example, the ramp 60 may also be planar. The intermediate region 65 protrudes a substantially constant amount above the base surface 21 and extends into the ramp 17 of the media return area 16 at the trailing edge 55 of the bar 45. The intermediate region 65 protrudes above the base surface 21 at a distance of approximately 0.2 mm. However, this distance may be altered to achieve different performance characteristics.

In the example of FIG. 1, an image capture area 94 is disposed in the media path 40 between the first, second, and third sides 5 and 10, 15 of the frame 1. The image capture area 94 is adjacent to the input edge 25 of the calibration area 20. The image capture area 94 can be configured to receive an optically transparent plate 95. The optically transparent plate 95 may be manufactured out of glass, for example. However, any other material that is optically transparent, possesses a low sliding coefficient of friction, and has an abrasion wear resistance similar to glass may be used to manufacture the plate 95.

Figure 6:
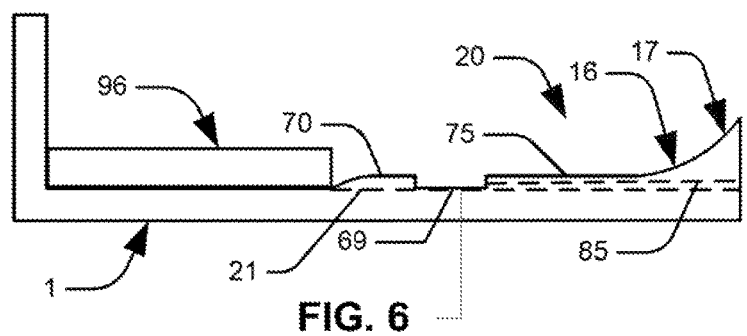
FIG. 6 illustrates a sectional view along "VI-VI" of FIG. 5

As shown in the examples FIGS. 2 and 6, the bars 45 can be configured relative to the plate 95 such that a top surface 96 of the plate 95 is elevated higher than a top surface 51 of the leading edge 50 of the bars 45. This configuration (e.g., referred to as a "waterfall") allows media to be smoothly transferred from the plate 95 to the bars 45 as the media moves through the media path 40 along the media path direction 35. The distance between the top surface 96 of the plate 95 and the top surface 51 of the leading edge 50 of the bars 45 may range from about 0 to about 1 mm (e.g., about 0.3 mm). However, this distance may be changed to achieve different performance characteristics yet still facilitate movement of media in the media path direction from the image capture area to the calibration area.

Figure 8:
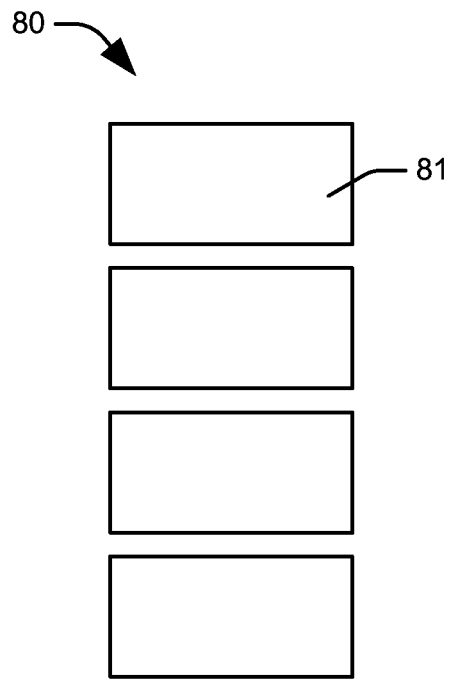
FIG. 8 illustrates a plan view of example calibration labels that can be used with the bezel illustrated in FIG. 1.

As demonstrated in the example of FIG. 8, a calibration label 80 can be disposed on the base surface 21 of the calibration area 20. The calibration label 80 can include one or multiple pieces 81. For the multi-piece example, each piece 81 is appropriately dimensioned to allow the piece to be attached to the base surface 21 between a respective adjacent pair of bars 45. The calibration label 80 may be made of a paper or plastic film material having one side provided with one or more predetermined color and/or other optical pattern. The opposite side may have an adhesive backing that allows attachment of the calibration label 80 to the base surface 21. In one example, the label is made as a multi-layered flexible structure, such as including a clear plastic layer coated on one side with one or more layers of paint having desired optical properties (e.g., white paint) and an adhesive layer on the bottom of the paint. However, the calibration label 80 may be many out of any other suitable material and may employ any other suitable attachment method. For example, the calibration label 80 may be made out of plastic and may be attached to the calibration area 20 by way of snap fittings.

Figure 5:
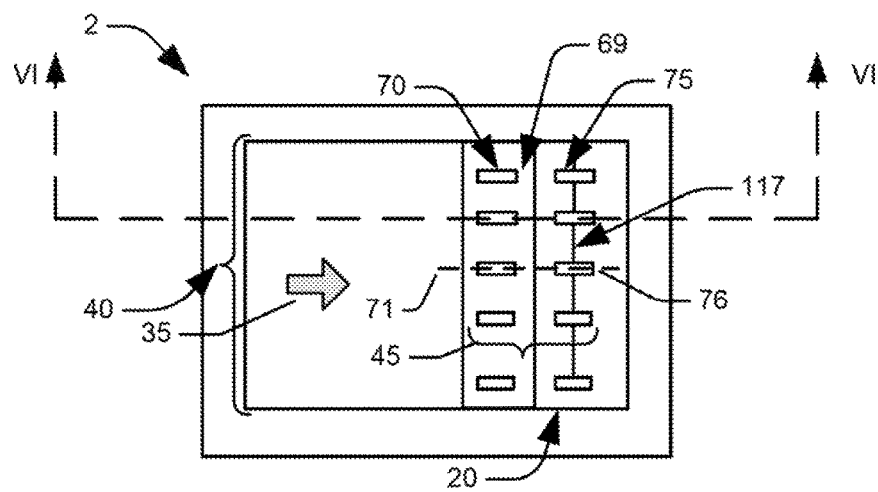
FIG. 5 illustrates a plan view of another example of a bezel with bars for protecting a calibration label.

Now referring to FIGS. 5 and 6, another example of a bezel with bars for protecting a calibration label is shown. The bezel 2 shown in FIGS. 5 and 6 differs from the bezel 2 shown in FIGS. 1-4 in that the bars 45 of the bezel shown in FIGS. 5 and 6 are segmented into a take-off portion 70 and a landing portion 75. The take-off portion 70 is separate and spaced apart from the landing portion 75 in the media path direction 35, thereby creating a gap 69 between the take-off portion 70 and the landing portion 75. The take-off portion 70 includes the leading edge 50 of the bar, and the landing portion 75 includes the trailing edge 55. In this example, each landing portion 75 has a longitudinal axis 76 that is coaxial with a longitudinal axis 71 of a respective take-off portion 70. In some examples, each take off portion and landing portion can include a leading edge that ramps outwardly from the surface to facilitate a transition of the media traveling in the media path direction similar to as disclosed herein with respect to the lead edge of the bars FIGS. 1-4.

Figure 9:
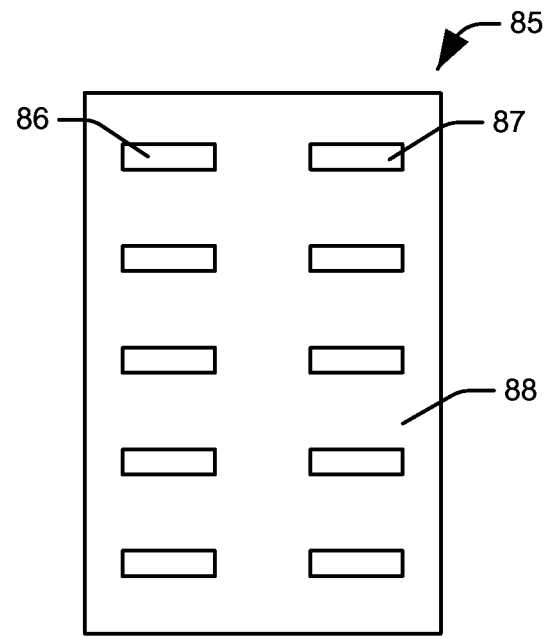
FIG. 9 illustrates a plan view of example calibration labels that can be used with the bezel illustrated in FIG. 5.

The base surface 21 of the calibration area 20 of the bezel 2 shown in FIGS. 5 and 6 can be provided with a calibration label 85, such as shown in FIG. 9. Since the distribution of take-off portions 70 and the landing portions 75 provide for a continuous surface 21, the calibration label 85 can be provided as a single piece 88. For example, the single piece 88 can be configured with a plurality of take-off portion apertures 86 and a plurality of landing portion apertures 87. Both of the apertures 86, 87 are appropriately sized and positioned so as to allow the take-off portion 70 and the landing portion 75 to be received in and extend through respective apertures 86, 87 when the calibration label 85 is positioned on the base surface 21 of the calibration area 20.

Figure 7:
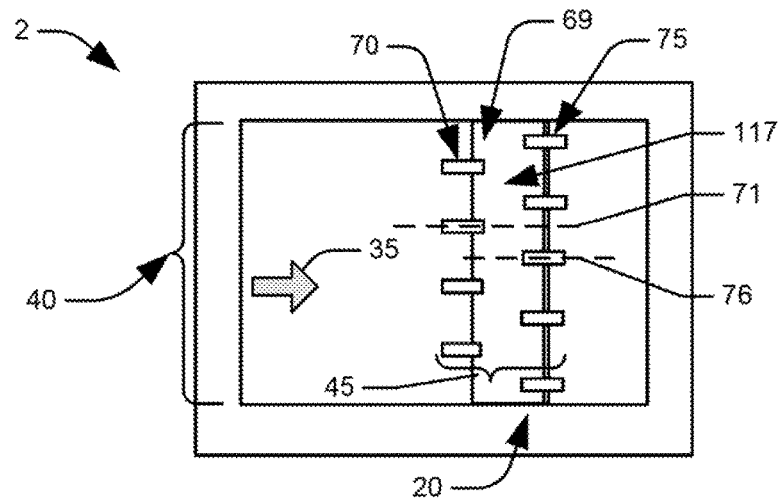
FIG. 7 illustrates a plan view of another example of a bezel with bars for protecting a calibration label.

FIG. 7 depicts yet another example of a bezel with bars for protecting a calibration label. In the example of FIG. 7, the bezel 2 is similar to the bezel 2 shown in FIGS. 5 and 6 in that both bezels have bars 45 that are segmented into a take-off portion 70 and a landing portion 75, thereby defining a gap 69. However, unlike the bezel 2 shown in FIGS. 5 and 6, the longitudinal axes 71, 76 of the bars 45 in the bezel 2 shown in FIG. 7 are not coaxial. Rather, the longitudinal axes 71, 76 of the bars 45 in the bezel 2 shown in FIG. 7 are offset from one another in a direction perpendicular to the media path direction 35.

Figure 10:
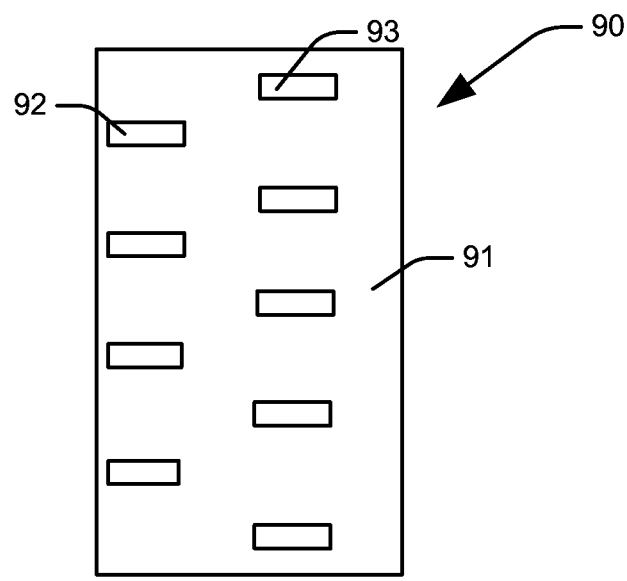
FIG. 10 illustrates a plan view of example calibration labels that can be used with the bezel illustrated in FIG. 7.

The base surface 21 of the calibration area 20 of the bezel shown in FIG. 7 is provided with a calibration label 90 shown in FIG. 10. Similar to the example of FIG. 9, the calibration label 90 is provided as a single piece 91. The single piece 91 is provided with a plurality of take-off portion apertures 92 and a plurality of landing portion apertures 93. Both of the apertures 92, 93 are appropriately sized and positioned so as to allow the take-off portion 70 and the landing portion 75 to be received in and extend through the appropriate apertures 92, 93 when the calibration label 85 is contacting the base surface 21 of the calibration area 20.

Figure 11:
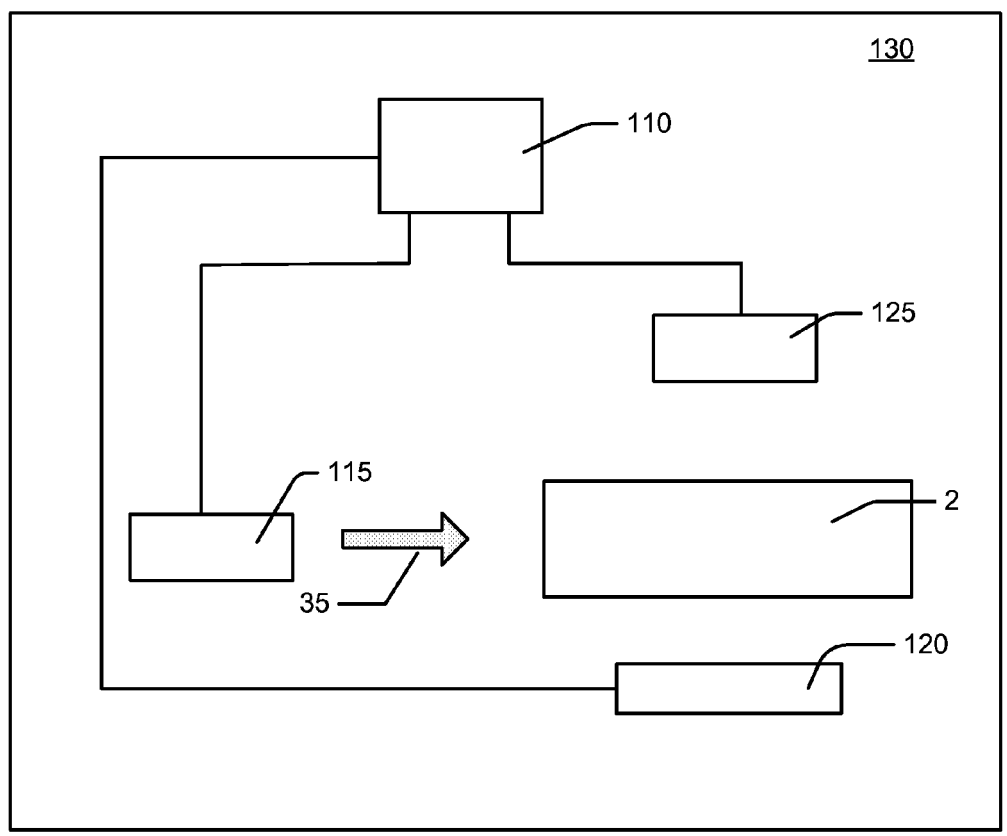
FIG. 11 illustrates a block diagram of a capture apparatus including a bezel with bars for protecting a calibration label.

Additional context for the bezel 2 disclosed with respect to FIGS. 1-10 will be appreciated with reference to FIG. 11. FIG. 11 depicts an example block diagram of an image capture apparatus 130. For example, the image capture apparatus can be a scanner, multi-function device, copier or the like. The image capture apparatus 130 may include any one of the bezels 2 shown in FIG. 1-7 and the respective calibration label shown in FIGS. 8-10. The image capture apparatus 130 further includes a control system 110 that controls a first side image sensor 120 and a second side image sensor 125. As an example, the image sensor 125 can be a contact image sensor and the image sensor 120 can be a CCD image sensor. The control system 110 further controls an automatic document feeder 115.

During operation of the image capture apparatus 130, the control system 110 directs the automatic document feeder 115 to move media through the media path 40 of the bezel 2 along the media path direction 35. The control system 110 directs the first side image sensor 120 to capture a first side of the media as the media passes through the image capture area 94 over the optically transparent plate 95. The control system 110 then directs the second side image sensor 125 to capture a second side of the media as the media passes over the calibration area 20. The second side image sensor 125 captures images along a scan line 117 (shown in FIGS. 1, 5, and 7). As the media passes from the optically transparent plate 95 to the calibration area 20, the bars 45 elevate the media above the calibration label (e.g., labels 80, 85, 90 of FIGS. 8, 9 10, respectively), thereby prevent contact between the media and the calibration label. As a result integrity of the calibration label 80, 85, 90 is preserved.

The first side image sensor 120 and the second side image sensor 125 are calibrated at the manufacturing facility. However, it may be necessary to recalibrate one or both the first side image sensor 120 and the second side image sensor 125 once the image capture apparatus 130 is in the field to ensure accurate image reproduction. To accomplish this, the control system 110 directs the second side image sensor 125 to capture the calibration area 20 along the scan line 117, thereby capturing the color and/or image pattern printed on the calibration label (e.g., labels 80, 85, 90 of FIGS. 8, 9 10, respectively). Capturing the calibration label provides the control system 110 with an image having known optical values, thereby allowing the control system 110 to calibrate the image capture apparatus 130, such as focal length adjustments.

In the examples of FIGS. 5-7, the gap 69 provided between the take-off portion 70 and the landing portion 75 of the bars 45 affords an uninterrupted optical surface on the calibration label 85, 90 between the first and second sides 5 and 10 of the frame 1. Accordingly, the second side contact image sensor can capture and process the image the scan line 117 for calibration without accommodating for the position of the bars.

In the example of the bezel shown in FIGS. 1-4, no gap is provided. Accordingly, the second side image sensor 125 is unable to capture an uninterrupted calibration label 80 along the scan line 117. To compensate for this, firmware or software instructions executable by the control system 110 may be utilized by the image capture apparatus 130 to compensate for areas between the calibration label 80 that are occupied by the bars 45. For example, the control system 110 can be programmed to interpolate the image at pixel locations corresponding to the wear bars and process corresponding adjusted image capture data for calibration of the sensor 125. Interpolation of these areas can be further facilitated based on the original factory calibration (e.g., stored in memory as original calibration data).

In view of the foregoing, an apparatus or system implementing wear bars can help extend the life of a calibration label. Additionally, since the calibration can be protected, a simpler and less expensive calibration label can be used. For example, instead of a label constructed from a glass sheet, which can be expensive and fragile, the use of wear bars can enable a less expensive construction (e.g., a paper with adhesive). Additionally, with the use of such less expensive calibration labels, their installation and repair can be greatly facilitated relative to existing designs.

What have been described above are only examples. It is, of course, not possible to describe every conceivable combination of components or methods, but one of ordinary skill in the art will recognize that many further combinations and permutations are possible. Accordingly, the described apparatus is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus comprising:
    a frame having a first side and a second side spaced apart from and substantially parallel to the first side by a third side that interconnects and extends longitudinally between the first side and the second side, the third side defining at least a portion of a media path, a surface of the third side including a calibration area in the media path, the calibration area extending from an input edge to an exit edge in a media path direction that is substantially transverse to a longitudinal dimension of the third side; and
    a plurality of bars protruding outwardly from the surface of the third side in the calibration area, each of the bars extending substantially parallel to the media path direction and having a leading edge and a trailing edge, the leading edge being adjacent to the input edge of the calibration area and the trailing edge being adjacent to the exit edge of the calibration area.

2. The apparatus of claim 1, wherein the third side further comprises a media return area extending between the first side and the second side of the frame, the media return area comprising a ramp that is positioned downstream of the calibration area in the media path direction.

3. The apparatus of claim 2, wherein the leading edge of each of the plurality of bars has a sloped surface that extends from the surface in the calibration area to an intermediate region of each respective bar, which intermediate region extends a substantially constant amount from the surface of the calibration area, and transitions into the ramp of the media return area at the trailing edge of each respective bar.

4. The apparatus of claim 3, wherein the intermediate region of each of the plurality of bars extends a distance above the surface of the calibration area ranging from about 0.05 to about 0.3 mm.

5. The apparatus of claim 1, wherein each of the plurality of bars is divided into a take-off portion that includes the leading edge, and a landing portion that includes the trailing edge, the take-off portion being separate and spaced apart from the landing portion in the media path direction.

6. The apparatus of claim 5, wherein a longitudinal axis of the landing portion is coaxial with a longitudinal axis of the take-off portion.

7. The apparatus of claim 5, wherein a longitudinal axis of the landing portion is offset a predetermined distance from a longitudinal axis of the take-off portion.

8. The apparatus of claim 5, further comprising a single-piece calibration label provided in the calibration area, the calibration label including apertures dimensioned and configured to receive each of the plurality of bars therethrough.

9. The apparatus of claim 1, further comprising a multi-piece calibration label positioned on the surface in the calibration area, the multi-piece calibration label comprising a plurality of label portions, each label portion dimensioned and configured for attachment to the surface in the calibration area between a respective adjacent pair of bars or between one of the first and second sides and an adjacent bar.

10. The apparatus of claim 1, wherein the frame further comprises an image capture area disposed in the media path between the first side, the second side and the third side of the frame upstream of the calibration area in the media path direction, the image capture area configured to receive an optically transparent plate therein, such that a top surface of the plate is elevated higher than a top surface of the leading edge of each of the plurality of bars, whereby movement of media in the media path direction from the image capture area to the calibration area is facilitated.

11. The apparatus of claim 10, wherein a distance between the top surface of the plate and the top surface of the leading edge of each of the plurality of bars ranges from about 0.05 mm to about 0.5 mm,
wherein a thickness of each of the bars in a direction perpendicular to the media path ranges from about 1 mm to about 2 mm, and
wherein each of the plurality of bars are equally spaced a distance of about 50 mm to about 70 mm in a direction perpendicular to the media path.

12. The apparatus of claim 1, wherein the leading edge of each of the bars is spaced apart from the input edge of the calibration area in the media path direction.

13. The apparatus of claim 1, wherein the frame and the plurality of bars comprise a monolithic structure.

14. An apparatus comprising:
a frame having a first side and a second side extending substantially parallel spaced apart from each other by a third side that interconnects and extends between the first side and the second side, a media path extending between the first side and the second side and through at least a portion of the third side, a surface of the third side including a calibration area in the media path, the calibration area extending from an input edge to an exit edge thereof in a media path direction that is substantially transverse to a longitudinal dimension of the third side;
the third side further comprising a media return area extending between the first side and the second side of the frame and has a ramp that is positioned downstream of the calibration area extending from the exit edge of the calibration area in the media path direction;
a plurality of bars protruding outwardly from the surface in the calibration area, each of the bars extending longitudinally in the media path direction, each of the plurality of bars having a ramping leading edge that extends from the surface in the calibration area to an intermediate region thereof and transitions into the ramp of the media return area; and
a calibration label disposed in the calibration area and extending between the first and second sides of the frame, such that the plurality of bars extend from the surface in the calibration area above the calibration label.

15. An image capture apparatus comprising:
a control system;
an automatic document feeder controlled by the control system;
an optical system controlled by the control system;
a bezel apparatus, the bezel apparatus including a surface in a media path that includes a calibration area, the calibration area comprising a plurality of bars that extend outwardly from the surface in the calibration area; and
a calibration label disposed in the calibration area, the calibration label being dimensioned and configured for attachment to the surface in the calibration such that the plurality of bars extend outwardly beyond the calibration label, the optical system including at least one image sensor configured to capture an image of at least a portion of the calibration label.

16. The image capture apparatus of claim 15, wherein the bezel apparatus further includes a frame that forms at least a part of the calibration area and the plurality of bars.

* * * * *